(12) United States Patent
Davies et al.

(10) Patent No.: US 7,536,584 B2
(45) Date of Patent: May 19, 2009

(54) FAULT-ISOLATING SAS EXPANDER

(75) Inventors: Ian Robert Davies, Longmont, CO (US); George Alexander Kalwitz, Mead, CO (US); James Boyd Lenehan, Erie, CO (US)

(73) Assignee: Dot Hill Systems Corporation, Carlsbad, CA (US)

( * ) Notice: Subject to any disclaimer, the term of this patent is extended or adjusted under 35 U.S.C. 154(b) by 411 days.

(21) Appl. No.: 11/552,140

(22) Filed: Oct. 23, 2006

(65) Prior Publication Data

US 2008/0010530 A1 Jan. 10, 2008

Related U.S. Application Data

(60) Provisional application No. 60/804,267, filed on Jun. 8, 2006.

(51) Int. Cl.
*G06F 11/00* (2006.01)
(52) U.S. Cl. .......................................................... 714/5
(58) Field of Classification Search ........................ None
See application file for complete search history.

(56) References Cited

U.S. PATENT DOCUMENTS

| | | | |
|---|---|---|---|
| 6,078,979 A | 6/2000 | Li et al. | |
| 7,290,074 B2 * | 10/2007 | Asano et al. | 710/110 |
| 7,423,995 B1 * | 9/2008 | Elliott et al. | 370/332 |
| 2005/0005062 A1 | 1/2005 | Liu et al. | |
| 2005/0071532 A1 * | 3/2005 | Bakke et al. | 710/300 |
| 2006/0034358 A1 | 2/2006 | Okamura | |
| 2006/0061369 A1 * | 3/2006 | Marks et al. | 324/542 |

(Continued)

FOREIGN PATENT DOCUMENTS

EP 1610225 12/2005

(Continued)

OTHER PUBLICATIONS

"05-212r0 SAS-2 System design considerations." Compiled by Barry Olawsky and Rob Elliott, HP. http://www.t10.org/ftp/t10/document.05/05-212r0.pdf; downloaded May 30, 2007; presentation given on May 26, 2005.

(Continued)

*Primary Examiner*—Gabriel L Chu
(74) *Attorney, Agent, or Firm*—E. Alan Davis; James W. Huffman

(57) ABSTRACT

A SAS expander includes SAS PHYs for transceiving signals with SAS devices on corresponding SAS links coupled to the SAS PHYs. The SAS expander includes status registers that provide fault detection parameters concerning communications on the SAS links. A microprocessor of the SAS expander identifies faulty communications on one of the SAS links, based on the fault detection parameters, and disables a corresponding one of the SAS PHYs coupled to the SAS link on which the microprocessor identified the faulty communications. The microprocessor may also report the PHY disabling to a SAS initiator. The microprocessor may also re-enable the PHY after corrective action is taken, such as in response to user input, an indication from a SAS device, or automatically detecting the corrective action. The expander may also automatically take the corrective action. The fault detection parameters may include error counters and corresponding thresholds, interrupt indicators, and state values.

58 Claims, 8 Drawing Sheets

U.S. PATENT DOCUMENTS

| | | |
|---|---|---|
| 2006/0101171 A1* | 5/2006 | Grieff et al. .................... 710/36 |
| 2007/0011373 A1* | 1/2007 | Marks et al. ................. 710/104 |
| 2007/0061632 A1* | 3/2007 | Uddenberg et al. ........... 714/44 |
| 2007/0061681 A1 | 3/2007 | Carmichael |
| 2007/0070885 A1* | 3/2007 | Uddenberg et al. ......... 370/225 |
| 2007/0087615 A1* | 4/2007 | Paulsen et al. .............. 439/378 |
| 2007/0088978 A1* | 4/2007 | Lucas et al. ..................... 714/9 |
| 2007/0100847 A1* | 5/2007 | Slutz et al. .................. 707/100 |
| 2007/0220204 A1* | 9/2007 | Nakajima et al. ........... 711/114 |

FOREIGN PATENT DOCUMENTS

| | | |
|---|---|---|
| WO | WO02073903 | 9/2002 |
| WO | WO02098059 | 12/2002 |

OTHER PUBLICATIONS

"PM8398 SXP 36×3GSec 36 Port SAS Expander Hardware Specification." Advance Issue No. 1; Sep. 2005. PMC-Sierra, Inc. Document No. PMC-2051557, Issue 1.

* cited by examiner

FAULT-ISOLATING SAS EXPANDER

CROSS REFERENCE TO RELATED APPLICATION(S)

This application claims priority to U.S. Provisional Application No. 60/804,267, filed Jun. 8, 2006, which is hereby incorporated by reference.

BACKGROUND OF THE INVENTION

Field of the Invention

The present invention relates in general to the field of Serial-Attached-SCSI (SAS) systems, and particularly to SAS expanders.

Serial-Attached-SCSI (SAS) systems are becoming more and more common in modern computer systems. SAS systems include SAS initiator devices and SAS target devices as does its parent, the Small Computer Systems Interface (SCSI). SAS target devices are typically storage devices, such as disk drives, that receive commands from SAS initiator devices, such as SAS host bus adapters in host computers or SAS I/O controllers in Redundant Arrays of Inexpensive Disks (RAID) controllers.

Implementations and uses of SAS are described in detail in the following documents, each of which is incorporated by reference in its entirety for all intents and purposes:

"Serial Attached SCSI—1.1 (SAS-1.1)", Revision 10, Sep. 21, 2005. Working Draft, Project T10/1601-D, Reference number ISO/IEC 14776-151:200x. American National Standard Institute. (http://www.t10.org/ftp/t10/drafts/sas1/sas1r10.pdf)

"Serial Attached SCSI—2 (SAS-2)", Revision 6, Sep. 22, 2006. Working Draft, Project T10/1760-D, Reference number ISO/IEC 14776-152:200x. American National Standard Institute. (http://www.t10.org/ftp/t10/drafts/sas2/sas2r06.pdf)

SAS systems are built on point-to-point serial connections between SAS devices. Each point-to-point connection is referred to as a link, or lane, and the two endpoints are referred to as a PHY. A PHY contains a transceiver and electrically interfaces to a link to communicate with another PHY at the other end of the link. The link, or lane, includes two differential signal pairs, one in each direction. A SAS port includes one or more PHYs. A SAS port that has more than one PHY grouped together is referred to as a wide port, and the more than one links coupling the two wide ports are referred to as a wide link. Wide ports and links provide increased data transfer rates between SAS endpoints.

The simplest SAS topology is a single SAS initiator having a SAS port that is connected by a single SAS link to a SAS port of a single SAS target. However, it is desirable in many applications, such as a high data availability RAID system, to enable one or more SAS initiators to communicate with multiple SAS target devices. In addition to initiators and targets, SAS includes a third type of device, expanders, which are employed in SAS systems to achieve more complex topologies. SAS expanders perform switch-like functions, such as routing, to enable SAS initiators and targets to communicate via the SAS point-to-point connections.

The present inventors have observed various problems in complex topology SAS systems when a component is marginal or goes bad, such as a SAS device that generates logical errors, improper PHY analog settings, a bad or marginal PHY, or a bad or marginal link, which may include bad or marginal cables, connectors, or printed circuit board assembly traces. Some of the manifestations of the faulty components include intermittent communication errors between SAS devices, complete loss of a SAS link, or failure of an entire SAS domain. Another manifestation is the inability for an initiator to see a SAS target in the topology due to intermittent failures that cause a SAS device to work sufficiently well to be allowed into the topology, but to be sufficiently faulty to prevent effective communication between SAS devices.

One method of dealing with these problems is an initiator-based solution. The initiator may attempt to identify the faulty component and send a command through the SAS domain to disable, or bypass, various PHYs in the domain in a trial-and-error approach until the initiator has isolated the problem. However, the present inventors have observed some failure scenarios which cannot be satisfactorily remedied by the initiator-based approach. For example, assume a component fails in an intermittent fashion, such as a marginal PHY, that causes a SAS expander to first detect that a SAS link is operating properly, to subsequently detect that the link is not operating properly, and to continue this sequence for a relatively long time. According to the SAS standard, the SAS expander is required to transmit a BROADCAST primitive on each of its SAS ports to notify other SAS devices of the change of status within the SAS domain. Each time a SAS initiator receives the BROADCAST primitive it is required to perform a SAS discover process to discover the device type, SAS address, and supported protocols of each SAS device in the SAS domain and to configure routing tables within the SAS expanders as needed. The SAS discover process can take a relatively large amount of time. If the SAS expander transmits BROADCAST primitives due to the operational to non-operational link transitions according to a period that is comparable to the SAS discover process time, then consequently the SAS initiator may be unable to effectively send commands though the SAS domain to identify and remedy the problem. Or, even if the initiator is successful in identifying and fixing the problem, the SAS domain may have been effectively unavailable for providing user data transfers for an unacceptable length of time.

Therefore, what is needed is a solution to improve the data availability in SAS systems, which are subject to the foregoing problems.

BRIEF SUMMARY OF INVENTION

The present invention provides an intelligent SAS expander that automatically detects faulty communications on one of its links and isolates the fault by disabling its PHY that is connected to the link on which it detects the faulty communications. In one embodiment, the intelligent SAS expander also reports the disabling of the PHY. In one embodiment, the intelligent SAS expander also recovers by re-enabling the previously disabled PHY after corrective action has been taken. The intelligent SAS expander monitors and analyzes various fault detection parameters to detect the faulty communications and isolate the faulty component by disabling the PHY.

In one aspect, the present invention provides a serial-attached-SCSI (SAS) expander for facilitating communication between SAS devices. The SAS expander includes a plurality of SAS PHYs, for transceiving signals with the SAS devices on a corresponding plurality of SAS links coupled to the plurality of SAS PHYs. The SAS expander also includes status registers, coupled to the plurality of SAS PHYs, configured to provide fault detection parameters concerning communications on the SAS links. The SAS expander also includes a microprocessor, coupled to the status registers. The microprocessor identifies faulty communications on one of the SAS links based on the fault detection parameters provided by the status registers. The microprocessor also disables a corresponding one of the plurality of SAS PHYs coupled to the one of the SAS links on which the microprocessor identified the faulty communications.

In another aspect, the present invention provides a method for increasing data availability in a serial-attached-SCSI (SAS) system including a SAS expander, having PHYs, for facilitating communications between a SAS initiator and a plurality of SAS target storage devices. The method includes the SAS expander identifying faulty communications on a SAS link connected to a PHY of the SAS expander. The method also includes the SAS expander disabling the SAS expander PHY, in response to identifying the faulty communications.

In another aspect, the present invention provides a serial-attached-SCSI (SAS) system. The system includes a SAS initiator, a plurality of SAS target storage devices, and a SAS expander, connected to the SAS initiator and to the plurality of SAS target devices by a plurality of SAS links. The SAS expander includes a plurality of PHYs, for coupling to the plurality of SAS links. The SAS expander identifies faulty communications on one of the plurality of SAS links and responsively disables one of the plurality of PHYs connected to the identified one of the plurality of SAS links.

An advantage of the present invention is that it provides a more direct, deterministic, and robust method for responding to faults in SAS systems than a SAS initiator-based solution. In particular, the intelligent SAS expanders described herein may directly disable a PHY associated with a detected fault by directly accessing registers within the SAS expander that control the PHY, without relying on the transmission of commands through the SAS domain to disable the PHY as required by an initiator-based solution, which, as described herein, might be ineffective or unacceptable with some failure modes.

DETAILED DESCRIPTION

Figure 1:
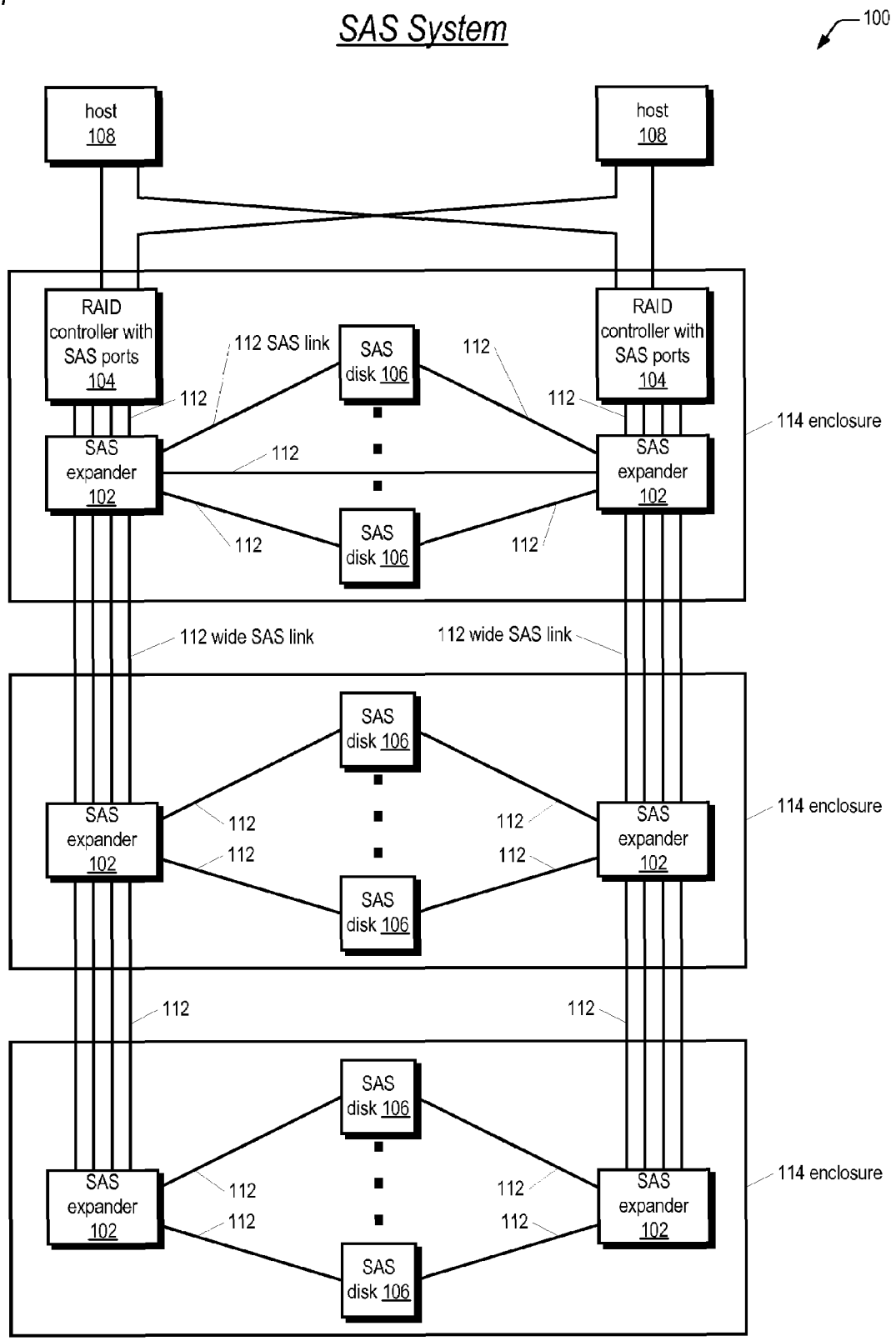
FIG. 1 is a block diagram of a SAS system according to the present invention.

Referring now to FIG. 1, a block diagram of a SAS system 100 according to the present invention is shown. The SAS system 100 includes two host computers 108 each coupled to two SAS-based RAID controllers 104, via a host interconnect such as Ethernet, FibreChannel, or the like. Each RAID controller 104 is coupled to a corresponding SAS expander 102 via a wide SAS link 112. In the embodiment of FIG. 1, the wide SAS links 112 between the RAID controllers 104 and the SAS expanders 102 are 4x wide. Each of the SAS expanders 102 is coupled to a plurality of SAS disks 106 via a corresponding SAS link 112. In the embodiment of FIG. 1, the SAS links 112 between the SAS expanders 102 and the SAS disks 106 are narrow (i.e., 1x) SAS links 112. The RAID controllers 104, SAS expanders 102, and SAS disks 106 are enclosed in an enclosure 114. Additionally, the SAS expanders 102 within the enclosure 114 are connected via a SAS link 112. In one embodiment, the inter-expander SAS link 112 is a 4x wide link. The inter-expander SAS link 112 advantageously provides a second SAS pathway for each RAID controller 104 to communicate with each of the SAS disks 106 through the SAS expander 102 that is directly connected to the other RAID controller 104.

Advantageously, the SAS expanders 102 of the SAS system 100 are intelligent SAS expanders 102 that include the ability to identify faulty communications on a SAS link 112 connected to one of the SAS expander 102 PHYs. Furthermore, the intelligent SAS expanders 102 include the ability to disable the identified PHY to isolate the faulty component, which may be the PHY itself, from the rest of the SAS system 100. Additionally, the intelligent SAS expanders 102 include the ability to report the disabled PHY. Finally, the intelligent SAS expanders 102 include the ability to recover from faulty condition. In one embodiment, a user notifies the SAS expander 102 that corrective action has been taken, such as replacing the faulty component (e.g., faulty cable, faulty SAS disk 106, or other faulty component), and the SAS expander 102 responsively repairs the communication between the SAS expander 102 and the other device by re-enabling the previously disabled PHY. In one embodiment, the SAS expander 102 is intelligent enough to automatically detect that a user has remedied the fault, and responsively re-enables the PHY. In one embodiment, the SAS expander 102 is intelligent enough to automatically take action to remedy the fault, such as by adjusting the PHY analog settings until reliable communications are restored. The SAS expander 102 includes a microprocessor that monitors status registers associated with the PHYs to identify faulty communications on a SAS link 112, writes to control registers to disable and re-enable the PHYs, and performs the reporting function, as discussed in detail below.

The SAS system 100 of FIG. 1 also includes second and third enclosures 114 similar to the first enclosure 114 described above; however, the second and third enclosures 114 do not include the RAID controllers 104, and are employed for enclosing only SAS disks 106 and two SAS expanders 102. Each SAS expander 102 in the first enclosure 114 is linked to a corresponding one of the SAS expanders 102 in the second enclosure 114 via a corresponding wide SAS link 112. Similarly, each SAS expander 102 in the second enclosure 114 is linked to a corresponding one of the SAS expanders 102 in the third enclosure 114 via a corresponding wide SAS link 112. In one embodiment, each enclosure 114 may enclose up to 12 SAS disks 106, in addition to the RAID controllers 104, SAS expanders 102, power supplies, cooling systems, management controllers, and other components as are well known in the storage system industry.

Advantageously, the SAS system 100 of FIG. 1 is arranged in a redundant manner to increase fault-tolerance of the SAS system 100. In particular, each SAS disk 106 is accessible by each of the RAID controllers 104 so that if a RAID controller 104, SAS link 112, or SAS expander 102 fails, the hosts 108 may continue to access the SAS disks 106 via a surviving RAID controller 104 or SAS pathway. The SAS system 100 of FIG. 1 is intended as an example of a SAS system 100 in which the present invention may be employed. However, the present invention is not limited to the system configuration shown in FIG. 1. Rather, the present invention may be employed in various SAS topologies that include SAS expanders. In some embodiments, the hosts 108 may also be included in the first enclosure 114.

As mentioned above, the SAS links 112 may include various components, such as cables, connectors, and printed circuit board assemblies that include signal conductors. In one embodiment, the SAS expander 102 comprises a PM8388 SXP 24×3G 24-port SAS expander available from PMC-Sierra, Inc., of Santa Clara, Calif., in which the present inventors have modified the code 222 (discussed below) to perform the fault identification, isolation, reporting, and repairing steps of the present invention described herein. In other embodiments, the SAS expander 102 comprises a modified version of the following PMC-Sierra models: PM8387 SXP 36×3G 36-port SAS expander, PM8399 SXP 24×3GSEC 24-port SAS expander, or PM8398 SXP 36×3GSEC 24-port SAS expander.

Although FIG. 1 illustrates a SAS system 100 including SAS disks 106, the present invention may be employed in a SAS system 100 including SATA disks 106, which are interoperable with SAS disks within a SAS domain. In particular, the SATA Tunneled Protocol (STP) provides a means for SAS/SATA initiators to communicate with SATA disks over the SAS hardware infrastructure.

Figure 2:
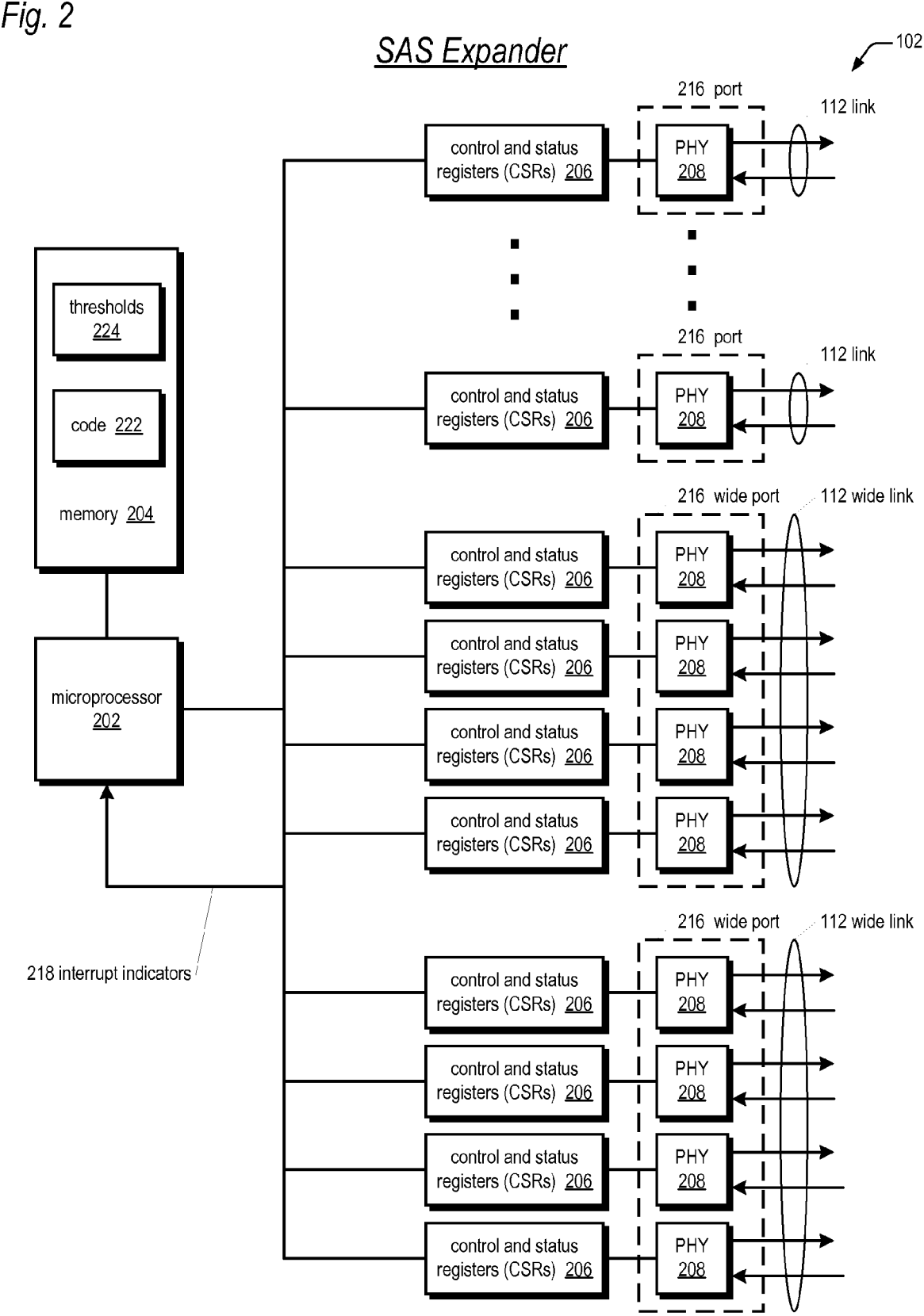
FIG. 2 is a block diagram illustrating in more detail the SAS expander of FIG. 1.

Referring now to FIG. 2, a block diagram illustrating in more detail the SAS expander 102 of FIG. 1 is shown. The SAS expander 102 includes a microprocessor 202 coupled to a memory 204 and a plurality of SAS ports 216. The memory 204 stores code 222 instructions that are fetched and executed by the microprocessor 202 to accomplish the fault identification, isolation, reporting, and repairing steps described herein. The memory 204 also stores threshold values 224 which the microprocessor 202 compares with counter values 392 (described below with respect to FIG. 3) to detect faulty communications, as discussed below.

Each SAS port 216 includes one or more SAS PHYs 208 that is connected to one of the SAS links 112 of FIG. 1. As shown, some of the SAS ports 216 are wide SAS ports 216 and some are narrow SAS ports 216. Each SAS port 216 also includes a SAS SERDES circuit (not shown).

The SAS expander 102 also includes a set of control and status registers (CSRs) 206 associated with each PHY 208, which the microprocessor 202 reads and writes to monitor fault detection parameters 300 (described below with respect to FIG. 3) and to control the PHYs 208, such as to disable and enable the PHYs 208. The fault detection parameters 300 and their use are described in more detail below with respect to the remaining Figures. In addition, the fault detection parameters 300 include interrupt indicators 218 from the PHYs 208 that are provided to notify the microprocessor 202 of events related to communication on the SAS links 112.

The SAS expander 102 also includes multiplexed data paths (such as a crossbar) and switching circuitry (not shown) that interconnect the various PHYs 208 to enable them to transfer commands and data from one PHY 208 to another to perform the switching function of the SAS expander 102. The SAS expander 102 may also include buffering circuits associated with each of the PHYs 208 for buffering the commands and data when received in a port 216 and when waiting to be transmitted out a port 216. The commands and data are routed through the network between the ports 216 based on routing table information, which in one embodiment is stored in the memory 204.

Figure 3:
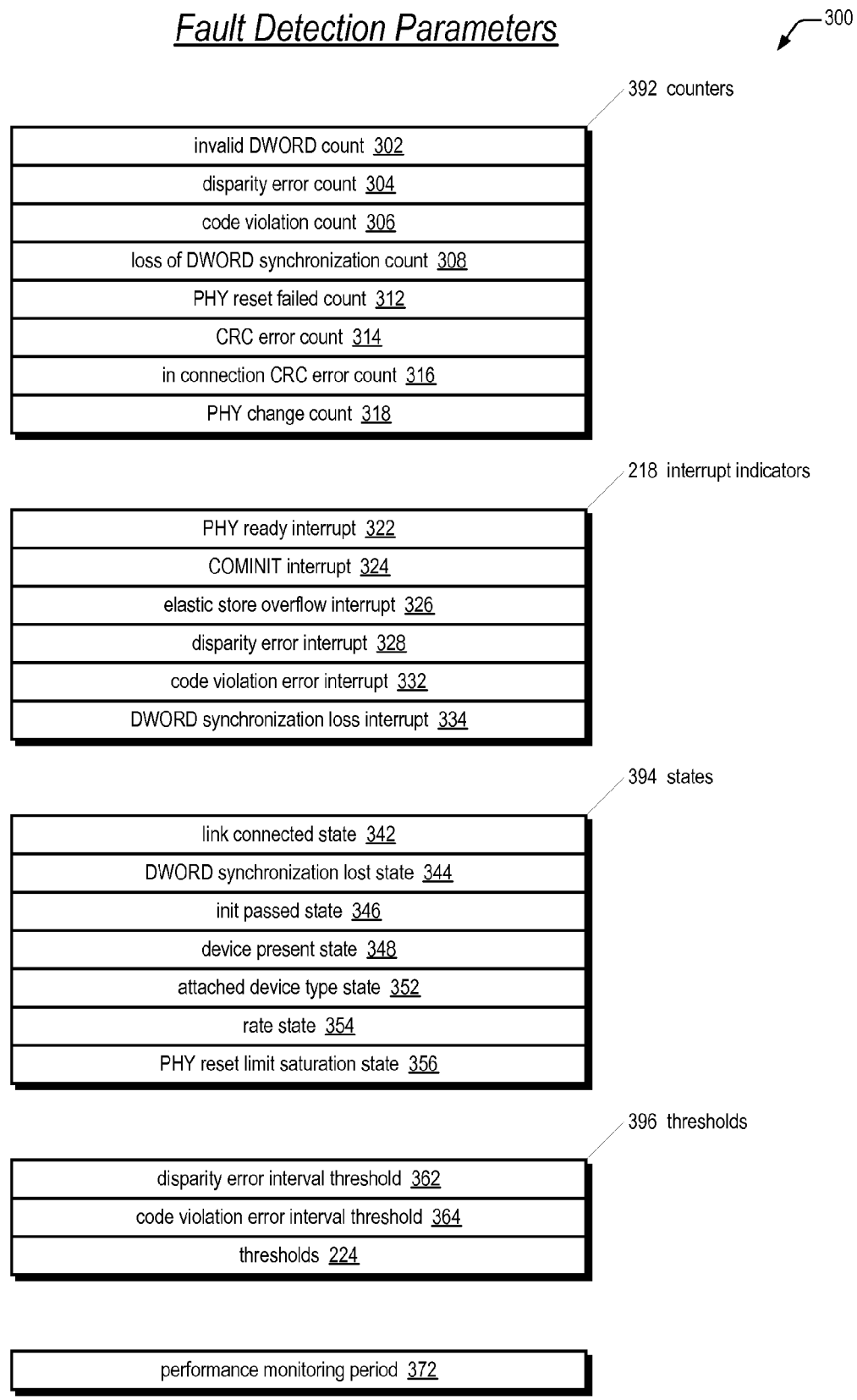
FIG. 3 is a block diagram illustrating fault detection parameters according to the present invention.

Referring now to FIG. 3, a block diagram illustrating fault detection parameters 300 according to the present invention is shown. The fault detection parameters 300 include the interrupt indicators 218, values stored in the CSRs 206, and values stored in the memory 204 of FIG. 2. The fault detection parameters 300 may be categorized generally as counters 392, interrupt indicators 218, states 394, thresholds 396 stored in the CSRs 206 and the thresholds 224 stored in the memory 204 of FIG. 2. The fault detection parameters 300 also include a performance monitoring period 372 stored in a CSR 206, whose use is described below.

The microprocessor 202 maintains a corresponding threshold 396 for each of the counters 392. Some of the thresholds 396 are stored in the CSRs 206, namely the disparity error interval threshold 362 and the code violation error interval threshold 364, and the SAS expander 102 hardware automatically compares them with the corresponding counter 392 value and generates an interrupt if the threshold is exceeded. The thresholds 224 corresponding to the other counter 392 values are stored in the memory 204, and the microprocessor 202 periodically compares the counter 392 values, or accumulated counts derived from the periodically sampled counter 392 values, with the thresholds 224 to identify faulty communications on the SAS links 112.

The counters 392 include an invalid DWORD count 302, which indicates the number of invalid DWORDs received outside PHY reset sequences; a disparity error count 304, which indicates the number of running disparity errors received outside PHY reset sequences; a code violation count 306, which indicates the number of times a decode error was detected on a bit stream; a loss of DWORD synchronization count 308, which indicates the number of times the PHY 208 has restarted the link reset sequence because it lost dword synchronization (i.e., the number of times the PHY 208 went from PHY ready state to COMINIT state); a PHY reset failed count 312, which indicates the number of times the PHY 208 has failed to obtain dword synchronization during final SAS speed negotiation; a CRC error count 314, which indicates the number of CRC DWORD errors detected for received IDENTIFY and OPEN address frames; an in connection CRC error count 316, which indicates the number of in connection CRC errors; and a PHY change count 318, which indicates the number of PHY change events that have been generated.

The interrupt indicators 218 include a PHY ready interrupt 322, which indicates the PHY 208 has finished initialization and is ready to transmit and receive data (A PHY 208 becomes ready only after COMINIT has been detected); a COMINIT interrupt 324, which indicates a valid COMINIT out of band (OOB) sequence has been successfully negotiated; a elastic store overflow interrupt 326, which indicates a valid DWORD was received and the internal elastic store, or buffer, is full; a disparity error interrupt 328, which indicates the disparity error interval threshold 362 has been exceeded during the number of clock cycles specified in the performance monitoring period 372; a code violation error interrupt 332, which indicates the code violation error interval threshold 364 has been exceeded during the number of clock cycles specified in the performance monitoring period 372; a DWORD synchronization loss interrupt 334, which indicates DWORD synchronization on the PHY 208 was lost and consequently the PHY 208 has restarted the link reset sequence.

The states 394 include a link connected state 342, which indicates whether the port 216 is in a connected state; a DWORD synchronization lost state 344, which indicates the PHY 208 has currently lost DWORD synchronization; an init passed state 346, which indicates whether the port 216 has successfully completed the link initialization sequence; a device present state 348, which indicates whether a device is connected to the PHY 208; an attached device type state 352, which indicates whether a SAS or SATA device was detected as being connected; a rate state 354, which indicates whether the final negotiated line rate is 1.5 or 3.0 Gbits/sec; a PHY reset limit saturation state 356, which indicates that the PHY 208 reset threshold has been reached.

In one embodiment, the SAS expander 102 is configured to receive from the RAID controllers 104 SCSI Enclosure Services (SES) pages that set and get the various fault detection parameters 300, that get the status of the PHYs 208, and that directly enable or disable individual PHYs 208. In one embodiment, control and status information, such as SES pages, may be sent via an out-of-band communication path between the SAS expanders 102 within an enclosure 114, such as an I²C connection or other communication path. The out-of-band communication path may be advantageously employed if the SAS expander 102 has disabled all PHYs 208 connecting the SAS expander 102 to an upstream SAS expander 102, such as might occur if the SAS cable connecting them is faulty. The disabling SAS expander 102 may communicate to the other SAS expander 102 in the enclosure 114 status information indicating that it has disabled the PHYs 208. In this situation, to avoid rebooting, the user may cause the other SAS expander 102 in the enclosure 114 to broadcast an SES page via the out-of-band communication path to the PHY-disabled SAS expander 102 instructing the SAS expander 102 to re-enable the disabled PHYs 208 after the cable has been replaced. The out-of-band communication path is particularly useful for the SAS expanders 102 within an enclosure 114 that do not have an inter-expander SAS link 112, which may not be present because the SAS specification does not allow loops within the SAS topology. Furthermore, the SAS expander 102 includes default values of the fault detection parameters 300 that are stored in a non-volatile memory of the SAS expander 102 and that are employed at boot time of the SAS expander 102. The default values may be modified by the RAID controllers 104 or by the microprocessor 202 during operation.

Figure 4:
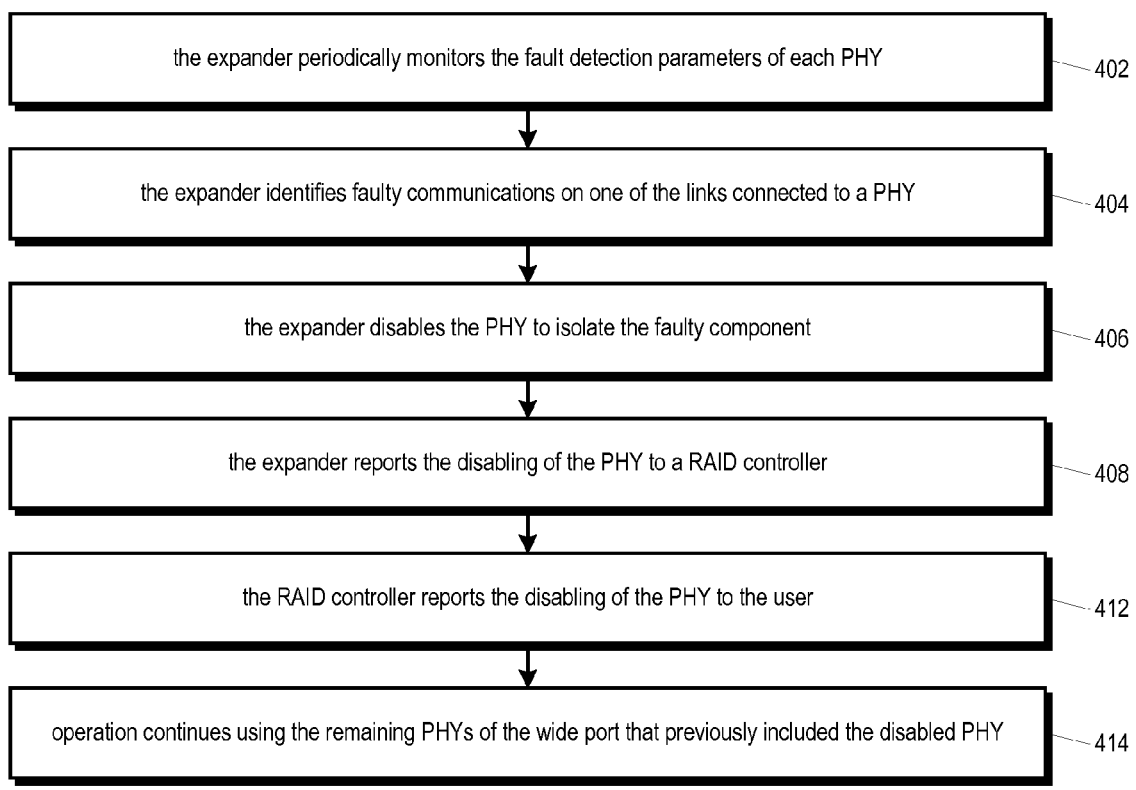
FIG. 4 is a flowchart illustrating operation of the SAS system of FIG. 1 according to one embodiment of the present invention.

Referring now to FIG. 4, a flowchart illustrating operation of the SAS system 100 of FIG. 1 according to one embodiment of the present invention is shown. Flow begins at block 402.

At block 402, the microprocessor 202 of FIG. 2 of the SAS expander 102 of FIG. 1 periodically monitors the fault detection parameters 300 of FIG. 3 of each of its PHYs 208. The interrupt indicators 218 are polled by the microprocessor 202. In one embodiment, the interrupts indicators 218 are received asynchronously by the microprocessor 202 as interrupt request signals. In one embodiment, in response to monitoring the fault detection parameters 300, the microprocessor 202 also updates a database that it maintains for providing status information to the RAID controllers 104. In one embodiment, the status information is provided via SES pages. In one embodiment, in response to monitoring the fault detection parameters 300, the microprocessor 202 also maintains and updates accumulated error counts stored in the memory 204 over multiple monitoring periods. In one embodiment, the monitoring period is determined by a timer interrupt to the microprocessor 202. Flow proceeds to block 404.

At block 404, the microprocessor 202 identifies faulty communications on a SAS link 112 connected to one of its PHYs 208 based on the monitoring at block 402. The microprocessor 202 analyzes the fault detection parameters 300 according to isolation rules embodied in the code 222 for fault indications to determine whether there is a need to disable a PHY 208. The identification of the faulty communications may include various criteria as discussed herein. An isolation rule may be triggered by one or more of the various counts exceeding a threshold, by detection that a PHY 208 has reached one or more particular states, that one or more particular events have occurred as indicated by one or more of the interrupt indicators 218, and various combinations thereof. In one embodiment, the microprocessor 202 only identifies faulty communications related to a PHY 208 if the PHY 208 is enabled. In one embodiment, the microprocessor 202 only identifies faulty communications related to a PHY 208 if isolation is allowed for the PHY 208. In one embodiment, the SAS expander 102 receives SES pages from the RAID controllers 104 to selectively enable and disable individual PHYs 208 and to selectively allow and disallow isolation of individual PHYs 208. Flow proceeds to block 406.

At block 406, the microprocessor 202 writes to a control register 206 to disable the PHY 208 identified at block 404. Flow proceeds to block 408.

At block 408, the SAS expander 102 reports the fact that the PHY 208 was disabled to one or both of the RAID controllers 104. In one embodiment, the SAS expander 102 also reports the reason the PHY 208 was disabled. In one embodiment, the SAS expander 102 also reports all threshold values used by the SAS expander 102 to make a determination to disable the PHY 208. In one embodiment, the SAS expander 102 reports by transmitting an SES diagnostic page to the RAID controller 104. In one embodiment, the SAS expander 102 reports by transmitting a Serial Management Protocol (SMP) message to the RAID controller 104. In one embodiment, the SAS expander 102 provides an interface to the RAID controllers 104 to enable the RAID controllers 104 to obtain the status of each PHY 208 and the current error counts, state, and events described herein. Flow proceeds to block 412.

At block 412, the RAID controller 104 reports that the PHY 208 was disabled to a user. In one embodiment, the RAID controller 104 reports to the user via a management interface. In one embodiment, the RAID controller 104 reports to the user by reporting to one or both of the hosts 108, which in turn notify the user. Flow proceeds to block 414.

At block 414, assuming the disabled PHY 208 is part of a wide port 216, communications between the SAS expander 102 port and the SAS device connected to the port 216 continue via the remaining PHYs 208 of the port 216 and associated SAS links 112 that are functioning properly. It is noted that the SAS system 100 may experience a proportionally lower data throughput due to the disabled PHY 208 and its respective SAS link 112. However, advantageously, by disabling the PHY 208 associated with the faulty SAS link 112 (or the PHY 208 itself may have been faulty), the likelihood that the SAS system 100 will continue functioning normally is increased, thereby improving the availability of the data on the SAS disks 106 to the hosts 108, rather than experiencing the various problems discussed herein. Flow ends at block 414.

Figure 5:
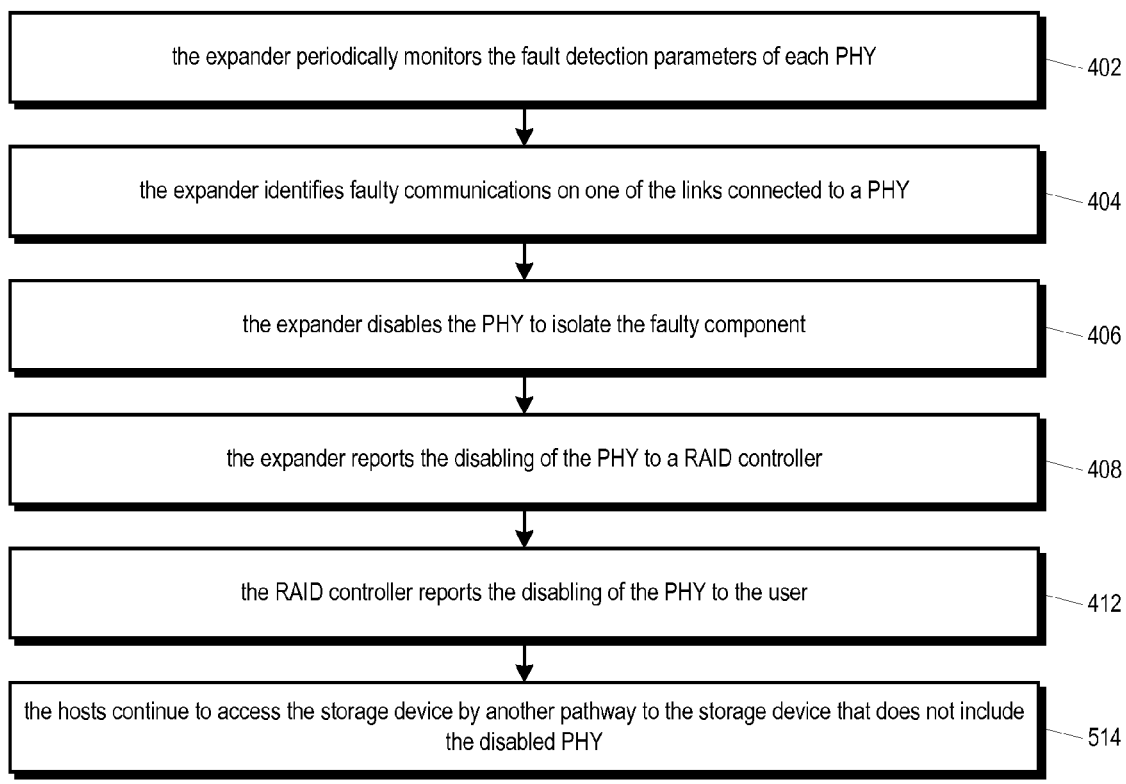
FIG. 5 is a flowchart illustrating operation of the SAS system of FIG. 1 according to an alternate embodiment of the present invention.

Referring now to FIG. 5, a flowchart illustrating operation of the SAS system 100 of FIG. 1 according to an alternate embodiment of the present invention is shown. The operation of the SAS system 100 as described in FIG. 5 assumes that the disabled PHY 208 was part of a narrow port 216 (rather than a wide port 216 as assumed with respect to FIG. 4) such that communication between the SAS expander 102 and the SAS device that was connected to the PHY 208 that was disabled at block 406 is no longer possible via the narrow SAS link 112 between the SAS expander 102 and the SAS device. Additionally, FIG. 5 does not describe attempts to recover normal functioning of the faulty SAS link 112, such as is described with respect to FIGS. 6 through 8. In situations where recovery of normal functioning is performed, the SAS system 100 may continue to operate as described in FIG. 4 or 5 (depending upon whether the disabled PHY 208 was part of a wide or narrow port 216) until the recovery of normal functioning is achieved.

Flow begins at block 402. Blocks 402 through 412 of FIG. 5 are the same as like-numbered blocks of FIG. 4 and for the sake of brevity are not described again here. Flow proceeds from block 412 of FIG. 5 to block 514.

At block 514, the hosts 108 continue to access the SAS disks 106 implicated by the PHY 208 disabled at block 406 via an alternate pathway that does not include the disabled PHY 208. With respect to the SAS system 100 of FIG. 1, the hosts 108 will communicate with the SAS disks 106 via the other RAID controller 104. Flow ends at block 512.

Figure 6:
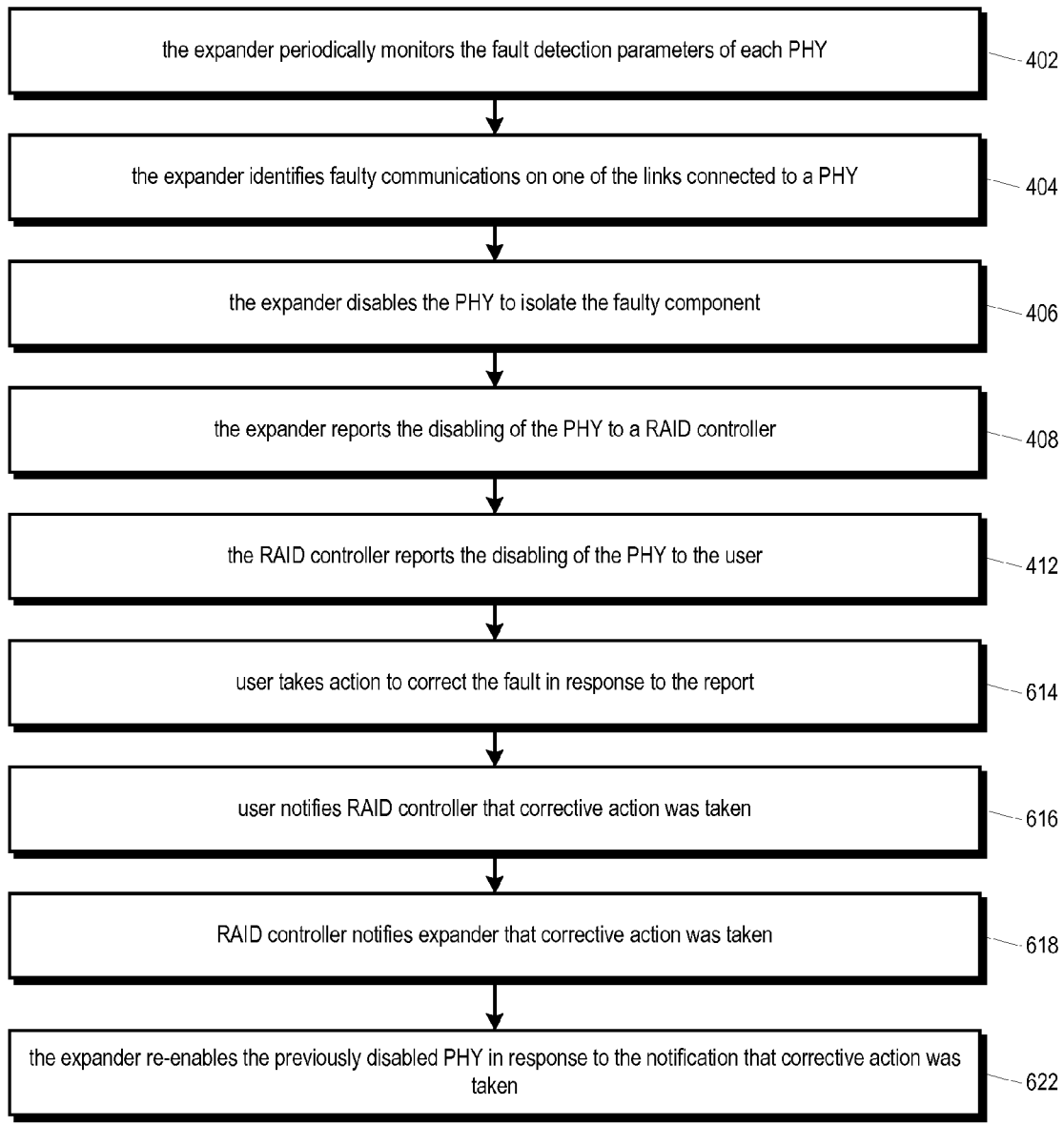
FIG. 6 is a flowchart illustrating operation of the SAS system of FIG. 1 according to an alternate embodiment of the present invention.

Referring now to FIG. 6, a flowchart illustrating operation of the SAS system 100 of FIG. 1 according to an alternate embodiment of the present invention is shown. FIG. 6 describes operation of the SAS system 100 of FIG. 1 in which the SAS expander 102 additionally re-enables the previously disabled PHY 208 in response to user input that the fault has been corrected.

Flow begins at block 402. Blocks 402 through 412 of FIG. 6 are the same as like-numbered blocks of FIG. 4 and for the sake of brevity are not described again here. Flow proceeds from block 412 of FIG. 6 to block 614.

At block 614, the user takes action to correct the faulty component in response to the reporting of the disabled PHY 208 at block 412. Examples of action that the user may take to correct the faulty component include, but are not limited to, replacing a cable, replacing a connector, replacing a SAS disk 106, replacing a SAS expander 102, replacing a RAID controller 104, and reconfiguring a PHY 208, such as to adjust its analog settings. Flow proceeds to block 616.

At block 616, the user notifies one of the RAID controllers 104 that he has taken the corrective action at block 614. In one embodiment, the user notifies the RAID controller 104 via a management interface. In one embodiment, the user notifies one of the hosts 108, which in turn notifies the RAID controller 104. Flow proceeds to block 618.

At block 618, the RAID controller 104 notifies the SAS expander 102 that the corrective action was taken. In one embodiment, the SAS expander 102 is notified by receiving a SCSI Enclosure Services (SES) diagnostic page from the RAID controller 104. In one embodiment, the SAS expander 102 is notified by receiving a Serial Management Protocol (SMP) message from the RAID controller 104. In one embodiment, the RAID controller 104 notifies the SAS expander 102 by explicitly instructing the SAS expander 102 to re-enable the PHY 208. Flow proceeds to block 622.

At block 622, the microprocessor 202 writes to a control register 206 to re-enable the PHY 208 that was previously disabled at block 406, in response to the notification that the corrective action was taken. Flow ends at block 622.

In one embodiment, the microprocessor 202 foregoes disabling the PHY 208 at block 406 if the PHY 208 is linked to another SAS expander 102 that is downstream from a RAID controller 104 linked to the SAS expander 102 that detected the fault. This advantageously simplifies recovery of certain failure modes on a SAS topology involving cascaded SAS expanders 102, such as the SAS system 100 of FIG. 1. For example, assume a cable is faulty that connects a SAS expander 102 in each of two of the enclosures 114 of FIG. 1 and both of the SAS expanders 102 detect the fault and disable their respective PHYs 208. In this example, to recover operation of the SAS link 112 once the cable is replaced may require coordination between the two SAS expanders 102 and potentially between the two RAID controllers 104. In contrast, by foregoing disabling the PHY 208 at block 406 if the PHY 208 is linked to a downstream SAS expander 102, the requirement for coordination is avoided.

Figure 7:
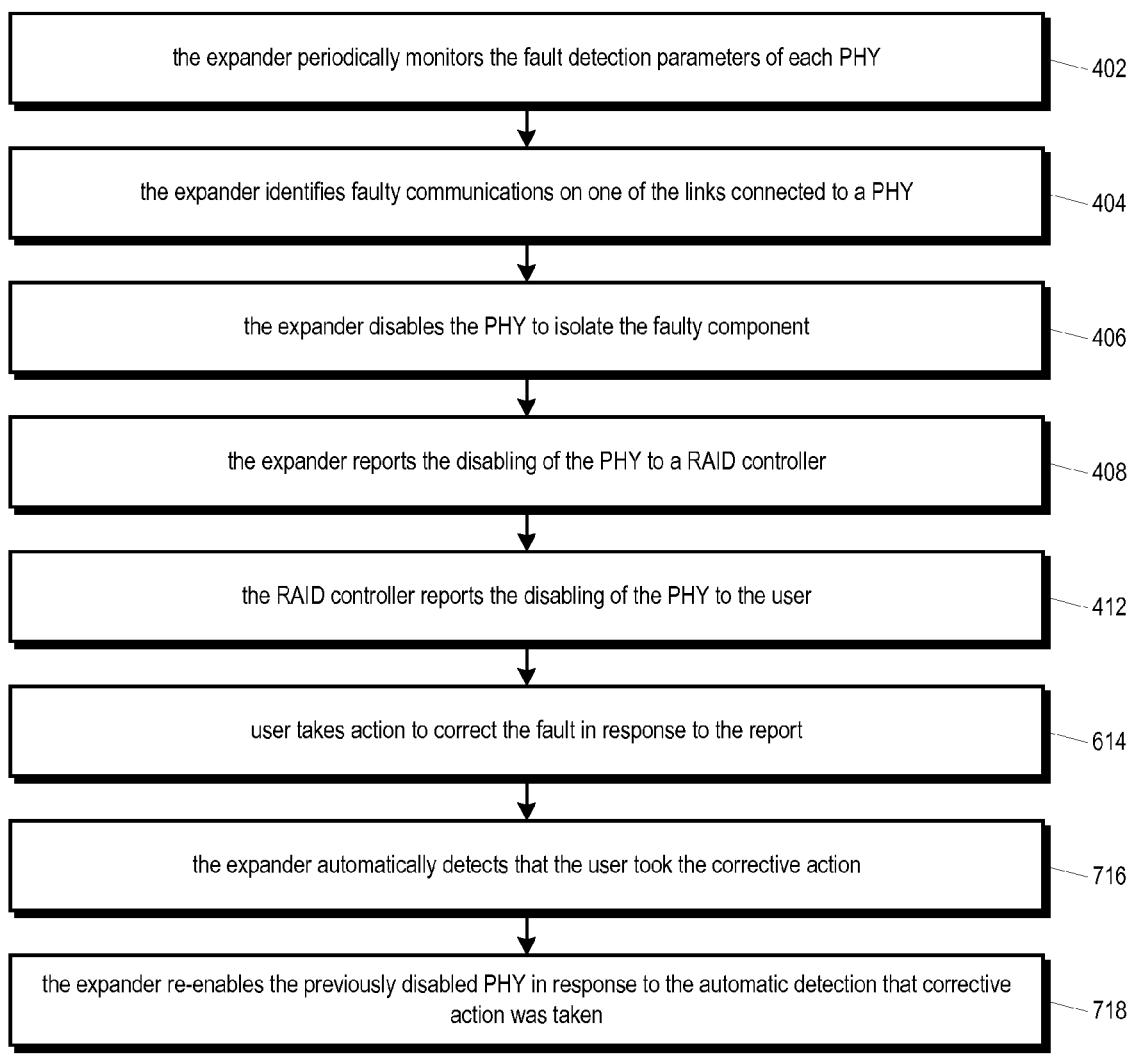
FIG. 7 is a flowchart illustrating operation of the SAS system of FIG. 1 according to an alternate embodiment of the present invention.

Referring now to FIG. 7, a flowchart illustrating operation of the SAS system 100 of FIG. 1 according to an alternate embodiment of the present invention is shown. FIG. 7 describes operation of the SAS system 100 of FIG. 1 in which the SAS expander 102 additionally re-enables the previously disabled PHY 208 in response to automatically detecting that the fault has been corrected.

Flow begins at block 402. Blocks 402 through 412 and 614 of FIG. 7 are the same as like-numbered blocks of FIG. 6 and for the sake of brevity are not described again here. Flow proceeds from block 614 of FIG. 7 to block 716.

At block 716, the microprocessor 202 automatically detects that the user took the corrective action at block 614. In one embodiment, the user corrective action automatically detected by the microprocessor 202 is a user replacing a cable. The microprocessor 202 automatically detects the cable replacement by detecting a change of state from link not connected to link connected via the link connected state 342 fault detection parameter 300. In one embodiment, the user corrective action automatically detected by the microprocessor 202 is a user replacing a SAS disk 106 or a SATA disk. The microprocessor 202 automatically detects the disk replacement by detecting a change of state from device not present to device present via the device present state 348 fault detection parameter 300 and detects whether the replaced disk is a SAS disk or a SATA disk via the attached device type state 352. In one embodiment, the user corrective action automatically detected by the microprocessor 202 is a user replacing a SAS expander 102. The microprocessor 202 automatically detects the SAS expander 102 replacement by detecting a change of state from device not present to device present via the device present state 348 fault detection parameter 300 of a PHY 208 connected to the replaced SAS expander 102 via the inter-expander SAS link 112 of FIG. 1 or via receiving status on the out-of-band communication path discussed above with respect to FIG. 3. In one embodiment, the user corrective action automatically detected by the microprocessor 202 is a user replacing a RAID controller 104. The microprocessor 202 automatically detects the RAID controller 104 replacement by detecting a change of state from device not present to device present via the device present state 348 fault detection parameter 300 of a PHY 208 connecting the SAS expander 102 to the replaced RAID controller 104. The above are provided as examples of automatically detected user corrective action performed by the microprocessor 202; however, the present invention is not limited to the embodiments described above, but may be employed for other user corrective action. Flow proceeds to block 718.

At block 718, the microprocessor 202 writes to a control register 206 to re-enable the PHY 208 that was previously disabled at block 406, in response to the automatic detection at block 716 that the corrective action was taken by the user. Flow ends at block 718.

Figure 8:
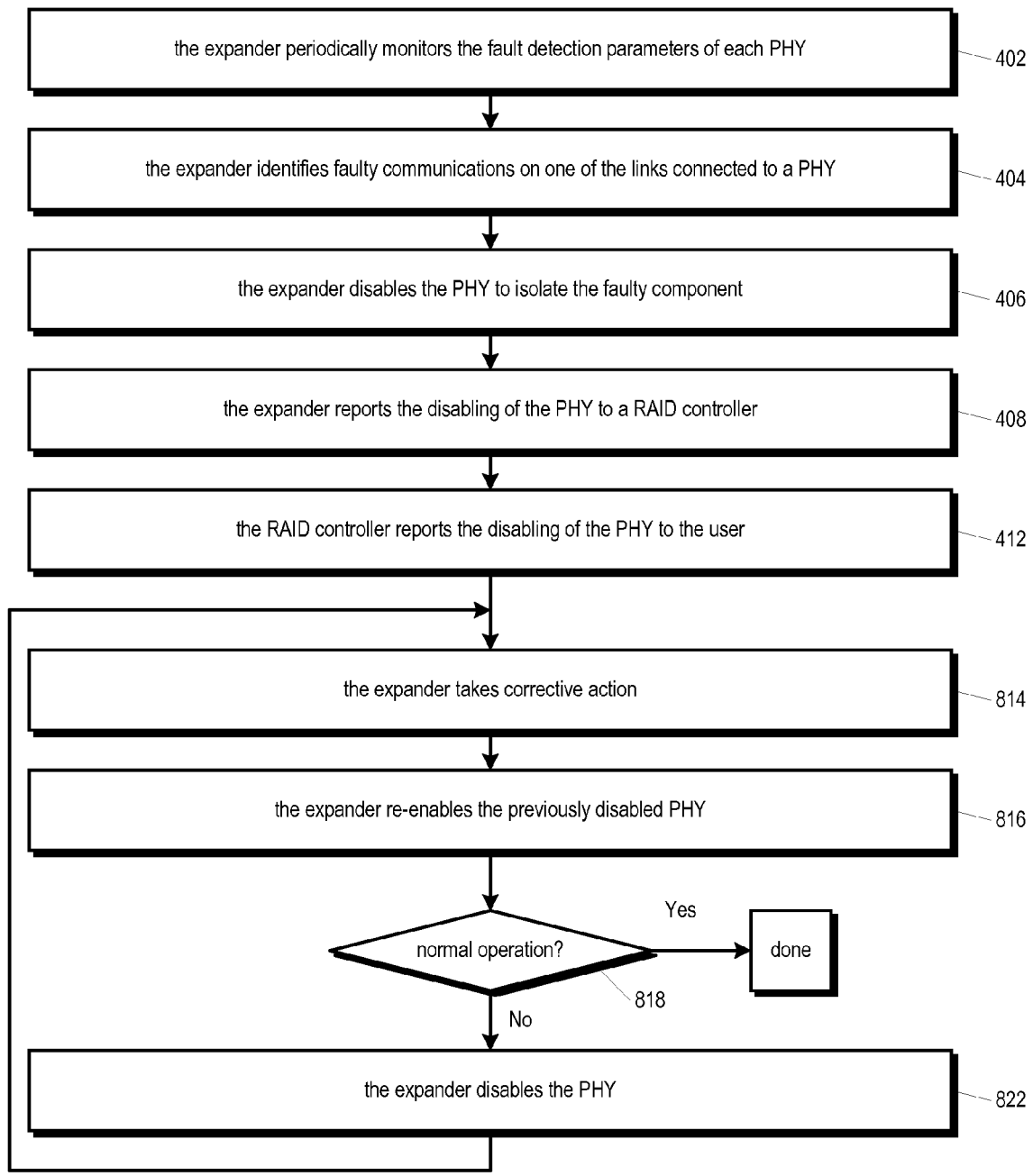
FIG. 8 is a flowchart illustrating operation of the SAS system of FIG. 1 according to an alternate embodiment of the present invention.

Referring now to FIG. 8, a flowchart illustrating operation of the SAS system 100 of FIG. 1 according to an alternate embodiment of the present invention is shown. FIG. 8 describes operation of the SAS system 100 of FIG. 1 in which the SAS expander 102 automatically takes action to attempt to correct the faulty condition and recover communications on the previously disabled PHY 208.

Flow begins at block 402. Blocks 402 through 412 of FIG. 8 are the same as like-numbered blocks of FIG. 4 and for the sake of brevity are not described again here. Flow proceeds from block 412 of FIG. 8 to block 814.

At block 814, the microprocessor 202 automatically takes corrective action. In one embodiment, the automatic corrective action taken by the microprocessor 202 is to automatically adjust the PHY 208 analog settings, which may cause the SAS link 112 to start functioning properly if, for example, the cable length has been changed since the last time the PHY 208 analog settings were set. Flow proceeds to block 816.

At block 816, the microprocessor 202 writes to a control register 206 to re-enable the PHY 208 that was previously disabled at block 406. Flow proceeds to decision block 818.

At decision block 818, the microprocessor 202 determines whether normal communications have been restored on the SAS link 112 after re-enabling the PHY 208. If so, flow ends; otherwise, flow proceeds to block 822.

At block 822, the microprocessor 202 disables the PHY 208 again. Flow returns from block 822 to block 814.

In one embodiment, the microprocessor 202 maintains a retry count threshold, and once the microprocessor 202 has performed the steps in the loop at blocks 814 to 822 a number of times that exceeds the retry threshold, the microprocessor 202 leaves the PHY 208 disabled and stops trying to automatically repair the fault until it detects an event indicating that it should re-enable the PHY 208.

In one embodiment, the microprocessor 202 increases the period of the steps performed in the loop at blocks 814 to 822 each time it disables the PHY 208 at block 822 in order to reduce the number of SAS discover processes that must be performed in response to the PHY 208 disabling/re-enabling. A management application client performs a SAS discover process to discover all the SAS devices and expander devices in the SAS domain (i.e., determining their device types, SAS addresses, and supported protocols). A SAS initiator device uses this information to determine SAS addresses to which it is able to establish connections. A self-configuring expander device uses this information to fill in its expander route table. Additionally, if there are multiple disabled PHYs 208 that need re-enabling, then the microprocessor 202 re-enables all of the disabled PHYs 208 at the same time in order to further reduce the number of SAS domain discover processes that must be performed.

Although the present invention and its objects, features, and advantages have been described in detail, other embodiments are encompassed by the invention. For example, although embodiments have been described in which the SAS initiators are RAID controllers, other embodiments are contemplated in which other types of SAS initiators are employed. Furthermore, although embodiments have been described in which the SAS targets are disk drives, other embodiments are contemplated in which other types of SAS storage devices are employed.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A serial-attached-SCSI (SAS) expander for facilitating communication between SAS devices, comprising:

a plurality of SAS PHYs, for transceiving signals with the SAS devices on a corresponding plurality of SAS links coupled to said plurality of SAS PHYs;

status registers, coupled to said plurality of SAS PHYs, configured to provide fault detection parameters concerning communications on said SAS links; and a microprocessor, coupled to said status registers, configured to:

identify faulty communications on one of said SAS links based on said fault detection parameters provided by said status registers;

disable a corresponding one of said plurality of SAS PHYs coupled to said one of said SAS links on which said microprocessor identified said faulty communications;

detect that action was taken to correct the faulty communications, after the microprocessor disables the SAS PHY, wherein the SAS expander receives information from a SAS initiator that a user took the corrective action to detect that the action was taken to correct the faulty communications; and re-enable the SAS PHY, after the microprocessor detects that the action was taken to correct the faulty communications.

2. The SAS expander of claim 1, wherein said microprocessor is configured to forego disabling said one of said plurality of SAS PHYs if said one of said plurality of SAS PHYs is linked to a second SAS expander, wherein said second SAS expander is downstream from a SAS initiator linked to the first SAS expander.

3. The SAS expander of claim 1, wherein said fault detection parameters provided by said status registers comprise fault counts associated with said communications on each of said SAS links.

4. The SAS expander of claim 3, wherein said microprocessor is configured to disable said one of said plurality of SAS PHYs based on whether one or more of said fault counts exceeds a corresponding predetermined threshold value.

5. The SAS expander of claim 3, wherein said fault counts comprise a count of disparity errors received on said SAS link.

6. The SAS expander of claim 3, wherein said fault counts comprise a count of decode errors detected on said SAS link.

7. The SAS expander of claim 3, wherein said fault counts comprise a count of dword synchronization losses causing link reset sequence restarts on said SAS link.

8. The SAS expander of claim 3, wherein said fault counts comprise a count of dword synchronization failures on said SAS link.

9. The SAS expander of claim 3, wherein said fault counts comprise a count of CRC dword errors detected on said SAS link.

10. The SAS expander of claim 9, wherein said count of CRC dword errors detected comprises CRC dword errors detected for IDENTIFY and OPEN address frames.

11. The SAS expander of claim 9, wherein said count of CRC dword errors detected comprises CRC dword errors detected while in a SAS connection.

12. The SAS expander of claim 3, wherein said fault counts comprise a count of PHY change events generated on said SAS link.

13. The SAS expander of claim 1, wherein said microprocessor is configured to fetch and execute code instructions to identify said faulty communications and to disable said corresponding one of said plurality of SAS PHYs.

14. The SAS expander of claim 1, further comprising:

control registers, coupled to said microprocessor, for controlling said plurality of SAS PHYs;

wherein said microprocessor is configured to write to said control registers to disable said one of said plurality of SAS PHYs.

15. The SAS expander of claim 1, further comprising:
interrupt indicators, coupled to said microprocessor, generated by said plurality of SAS PHYs, for notifying said microprocessor of events regarding said communications on said SAS links;
wherein said microprocessor is configured to identify said faulty communications based on said interrupt indicators.

16. The SAS expander of claim 15, further comprising:
input buffers, coupled to said plurality of SAS PHYs, configured to receive data from said plurality of SAS PHYs;
wherein said events comprise an overflow of said received data out of one of said input buffers.

17. The SAS expander of claim 15, wherein said events comprise a transition of one of said plurality of SAS PHYs to a ready state.

18. The SAS expander of claim 15, wherein said events comprise a successful execution of a SAS COMINIT sequence with one of said plurality of SAS PHYs.

19. The SAS expander of claim 1, wherein said fault detection parameters provided by said status registers comprise a state associated with said communications on each of said SAS links, wherein said microprocessor is configured to identify said faulty communications on said one of said SAS links based on said state.

20. The SAS expander of claim 19, wherein said state indicates whether said SAS PHY has been reset a predetermined number of times.

21. The SAS expander of claim 19, wherein said state indicates whether a SAS device is connected to said corresponding SAS link coupled to said SAS PHY.

22. The SAS expander of claim 19, wherein said state indicates whether a corresponding SAS link is connected to said SAS PHY.

23. The SAS expander of claim 19, wherein said state indicates whether a corresponding SAS link connected to said SAS PHY was successfully initialized.

24. The SAS expander of claim 1, further comprising:
a memory, coupled to said microprocessor, for additionally storing said fault detection parameters, wherein said microprocessor is configured to identify said faulty communications further based on said fault detection parameters stored in said memory.

25. A method for increasing data availability in a serial-attached-SCSI (SAS) system including a SAS expander, having PHYs, for facilitating communications between a SAS initiator and a plurality of SAS target storage devices, the method comprising:
identifying, by the SAS expander, faulty communications on a SAS link connected to a PHY of the SAS expander;
disabling, by the SAS expander, the SAS expander PHY, in response to said identifying the faulty communications;
detecting, by the SAS expander, that action was taken to correct the faulty communications, after said disabling the SAS expander PHY, wherein said detecting comprises receiving information from the SAS initiator that a user took the corrective action;
re-enabling, by the SAS expander, the SAS expander PHY, in response to said detecting.

26. The method of claim 25, further comprising:
reporting, by the SAS expander, said disabling.

27. The method of claim 26, wherein said reporting, by the SAS expander, said disabling comprises reporting, by the SAS expander, said disabling to the SAS initiator.

28. The method of claim 27, wherein said reporting, by the SAS expander, said disabling to the SAS initiator comprises reporting, by the SAS expander, said disabling to the SAS initiator status information for the SAS initiator to report to a user.

29. The method of claim 26, wherein said reporting, by the SAS expander, said disabling comprises reporting, by the SAS expander, said disabling via a SCSI Enclosure Services (SES) page.

30. The method of claim 26, wherein said reporting, by the SAS expander, said disabling comprises reporting, by the SAS expander, said disabling via a Serial Management Protocol (SMP) message.

31. The method of claim 25, wherein said detecting comprises receiving information from one of the plurality of SAS target storage devices that a user took the corrective action.

32. The method of claim 25, wherein the corrective action comprises replacing a SAS cable coupled to the SAS expander PHY.

33. The method of claim 25, wherein the corrective action comprises replacing the SAS controller.

34. The method of claim 25, wherein the corrective action comprises replacing one of the plurality of SAS target storage devices.

35. The method of claim 25, wherein the corrective action comprises the SAS initiator sending a command to reconfigure a PHY in the SAS system.

36. The method of claim 25, wherein the corrective action comprises the SAS expander taking the corrective action.

37. The method of claim 36, wherein the SAS expander taking the corrective action comprises the SAS expander adjusting analog settings of the SAS expander PHY.

38. The method of claim 25, wherein said detecting comprises automatically detecting, by the SAS expander, that a SAS cable coupled to the SAS expander PHY was replaced.

39. The method of claim 25, wherein said detecting comprises automatically detecting, by the SAS expander, that the SAS initiator was replaced.

40. The method of claim 25, wherein said detecting comprises automatically detecting, by the SAS expander, that said one of the plurality of SAS target storage devices was replaced.

41. The method of claim 25, wherein said detecting comprises detecting, by the SAS expander, that the SAS initiator sent a command to reconfigure a PHY in the SAS system.

42. The method of claim 25, wherein said detecting comprises detecting, by the SAS expander, the SAS expander taking the corrective action.

43. The method of claim 42, wherein the SAS expander taking the corrective action comprises the SAS expander adjusting analog settings of the SAS expander PHY.

44. The method of claim 25, further comprising:
(1) re-enabling, by the SAS expander, the SAS expander PHY, after said disabling;
(2) determining, by the SAS expander, whether the faulty communications are persisting, after said re-enabling the SAS expander PHY;
(3) disabling, by the SAS expander, the SAS expander PHY again if the faulty communications are persisting; and
repeating, by the SAS expander, said steps (1), (2), and (3) until the faulty communications are no longer persisting at step (2).

45. The method of claim 44, wherein said repeating is performed periodically.

46. The method of claim 45, wherein said repeating is performed with a monotonically increasing period.

47. The method of claim 44, further comprising:
(4) adjusting, by the SAS expander, analog settings of the SAS expander PHY, after said step (3); and
repeating, by the SAS expander, said steps (1), (2), (3), and (4) until the faulty communications are no longer persisting at step (2).

48. The method of claim 47, further comprising:
monitoring, by the SAS expander, fault detection parameters maintained by the SAS expander;
wherein said identifying is performed by the SAS expander based on said monitoring.

49. The method of claim 48, wherein said monitoring is performed periodically by a microprocessor of the SAS expander.

50. The method of claim 49, wherein the SAS initiator comprises a redundant array of inexpensive disks (RAID) controller.

51. The method of claim 48, wherein the fault detection parameters comprise error count values related to communications on SAS links connected to the SAS expander PHYs.

52. The method of claim 51, wherein the fault detection parameters comprise threshold values for comparing with the error count values to determine whether the threshold values have been exceeded.

53. The method of claim 48, wherein the fault detection parameters comprise interrupt indicators to a microprocessor of the SAS expander PHY that indicate events related to communications on SAS links connected to the SAS expander PHYs.

54. The method of claim 48, wherein the fault detection parameters comprise state values related to communications on SAS links connected to the SAS expander PHYs.

55. The method of claim 47, wherein said repeating is performed no more than a predetermined number of times.

56. A serial-attached-SCSI (SAS) system, comprising:
a SAS initiator;
a plurality of SAS target storage devices; and
a SAS expander, connected to said SAS initiator and to said plurality of SAS target devices by a plurality of SAS links, said SAS expander comprising a plurality of PHYs, for coupling to said plurality of SAS links, wherein said SAS expander is configured to identify faulty communications on one of said plurality of SAS links and to responsively disable one of said plurality of PHYs connected to said identified one of said plurality of SAS links, wherein the SAS expander is further configured to detect that action was taken to correct the faulty communications, after disabling the SAS PHY, wherein the SAS expander receives information from a SAS initiator that a user took the corrective action to detect that the action was taken to correct the faulty communications, wherein the SAS expander is further configured to re-enable the SAS PHY, after detecting that the action was taken to correct the faulty communications.

57. The system of claim 56, further comprising:
a second SAS initiator; and
a second SAS expander, connected to said second SAS initiator and to said plurality of SAS target devices by a second plurality of SAS links;
wherein said second SAS initiator is configured to continue to communicate with said plurality of SAS target devices via said second plurality of SAS links after said first SAS expander disables said one of said plurality of PHYs connected to said identified one of said plurality of SAS links.

58. The system of claim 56, wherein at least two of said plurality of PHYs are grouped into a wide SAS port for communicating with said SAS initiator on a wide SAS link comprising a corresponding at least two of said plurality of SAS links, wherein said SAS expander is configured to disable one of said at least two of said plurality of PHYs of said wide SAS port, wherein said SAS expander is configured to continue to communicate with said SAS initiator via remaining ones of said at least two of said plurality of PHYs after said SAS expander disables said one of said at least two of said plurality of PHYs of said wide SAS port.

* * * * *